Nov. 2, 1926.
G. S. PERKINS
DEPOSITOR
Filed Jan. 2, 1924
1,605,609
2 Sheets-Sheet 2
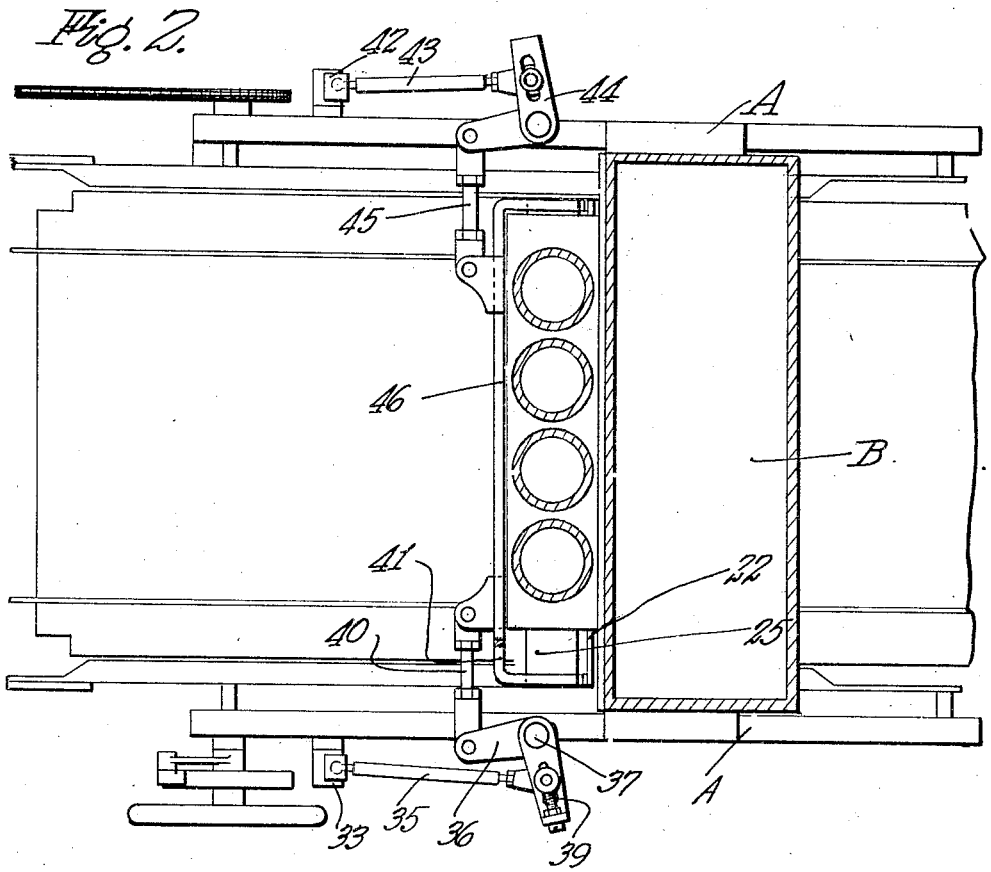
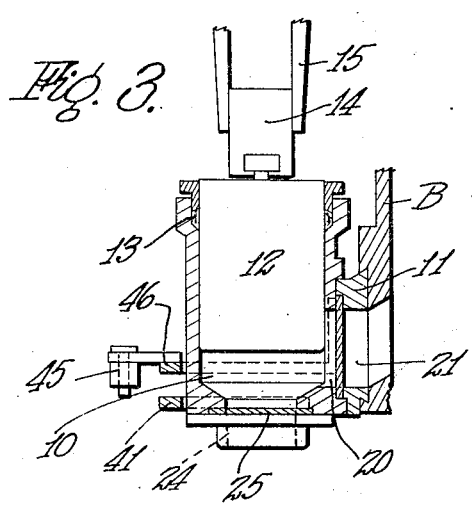
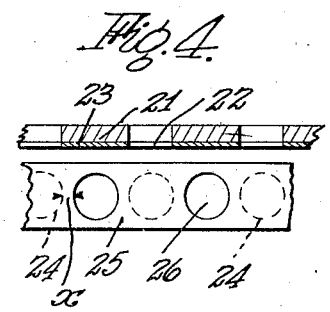
INVENTOR
George S. Perkins
BY Chapin & Neal
ATTORNEYS Patented Nov. 2, 1926.

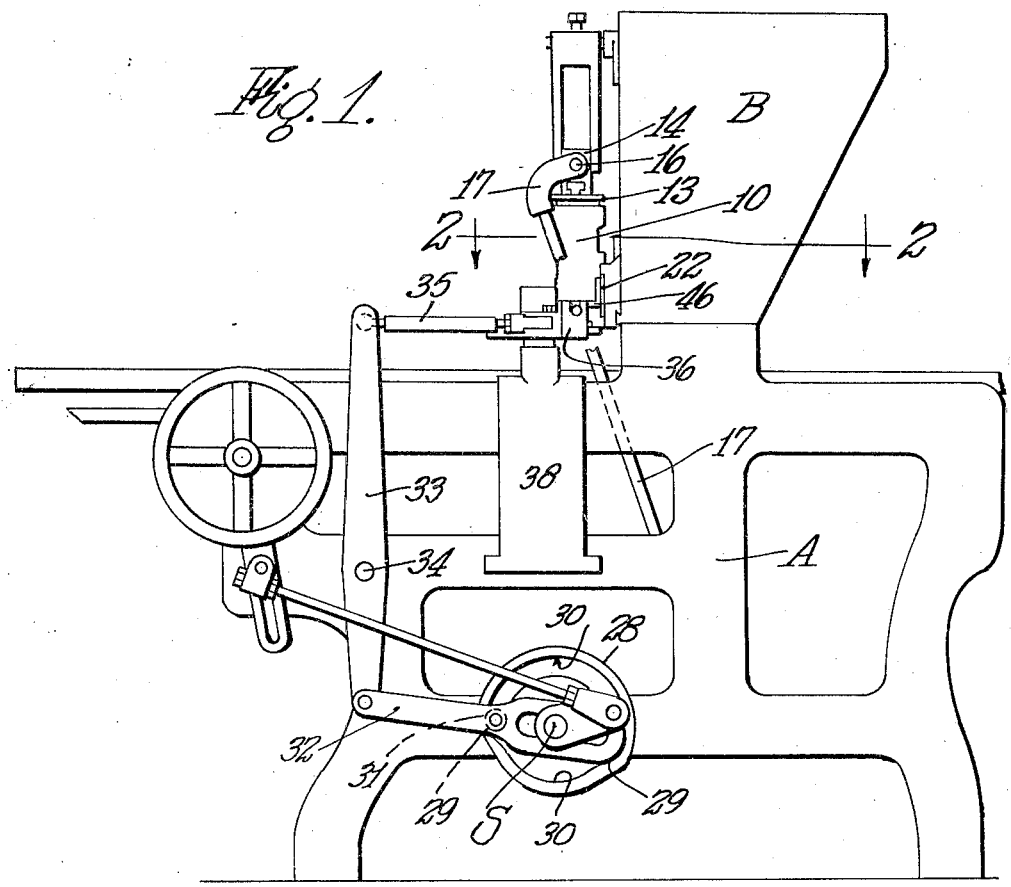

1,605,609

UNITED STATES PATENT OFFICE.

GEORGE S. PERKINS, OF SPRINGFIELD, MASSACHUSETTS, ASSIGNOR TO NATIONAL EQUIPMENT COMPANY, A CORPORATION OF MASSACHUSETTS.

DEPOSITOR.

Application filed January 2, 1924. Serial No. 683,982.

This invention relates to improvements in depositors and more particularly to the valve mechanism which controls the inlets and outlets of the force feed depositing mechanism.

The invention is concerned with a particular type of depositor, namely, one in which the cut off bar or bars, controlling the inlets and outlets of the force feed depositing mechanism, are slidable transversely with respect to such mechanism. The depositing mechanism includes a series of pump cylinders arranged in spaced relation in a transverse row and the cut off bars are slidable in a direction parallel to the line of said row.

In depositors of this type, the inlet and outlet cut off bars have always been movable in unison and, in fact, are commonly made integral and are operated from a common means, such as a cam. While such an arrangement has the advantage of simplicity and economy of material and is satisfactory enough in a great many cases, difficulty is encountered with this arrangement when used in connection with the larger depositors, particularly, the so called weighing machines. These machines are frequently used for casting large cakes of chocolate such as are sold to manufacturers of confectionery and it is desired to have each cake of a definite unit weight. The depositor, while it does not weigh the material, is commonly called a weighing machine because it is supposed to measure out a definite volume of chocolate which will have the desired unit weight. Machines for this special purpose must measure accurately under all ordinary conditions. The difficulty encountered is that the measured quantities sometimes vary with the amount of material in the supply tank of the depositor and the factor of hydraulic head should be eliminated from the problem because it is not ordinarily feasible to keep the level in the supply tank constant.

In tracing out the reasons for the discrepancies in measurement under various levels of material in the supply tank, I have found that the cut off bars, when operating in unison, permit the pump cylinders at certain stages of operation to communicate with both inlet and outlet at the same time. Opportunity is thus offered for gravity flow of the material from the supply tank through the outlet and naturally the amount of material, thus escaping, will vary with the hydraulic head in the supply tank. The material, being viscous, does not flow readily and the errors due to such free flow are not as noticeable as would otherwise be the case and consequently have been more difficult to detect.

While the trouble might be remedied by increasing the spacing of the openings in the cut off bars, this cannot be done without changing the spacing of the pump cylinders and such a remedy is not practical and commercially feasible because confectionery manufacturers are already supplied with large and expensive mold equipment which is built to suit the existing spacing of the pump cylinders and the manufacturer of confectionery machines cannot readily sell machines if they require new mold equipment.

This invention is concerned with, and has for its object, the provision of a solution of the problem above set forth which solution will satisfy the manufacturer as well as the user of the depositing machine.

More particularly, the invention has for its object to provide, in a depositor having cut off bars movable in the manner above set forth, means for independently operating them, whereby each may be rapidly operated at the proper time and to a relatively large degree, in order to prevent at all times a condition wherein free flow from the supply tank through the pump cylinder and its outlet can occur.

Other objects and advantages will appear in the following description and in the illustrative embodiment of the invention in the accompanying drawings, in which—

Fig. 1 is a side elevational view of a depositor embodying the invention;

Fig. 2 is a sectional plan view taken on the line 2—2 of Fig. 1;

Fig. 3 is an enlarged, fragmentary, sectional elevational view showing one pump unit and its cut off bars; and Fig. 4 is a diagrammatical view showing the relation of the cut off bars with the inlets and outlets of the pump cylinders.

Referring to these drawings, the depositor chosen to illustrate the invention is of a type too well known to require extended description. It includes spaced side frames A which support between them a supply receptacle B for the material to be deposited. Below this receptacle, and between frames A, the molds, in which the material from receptacle B is to be deposited, are conveyed by any suitable mechanism. The latter, being unnecessary to an understanding of the present invention, has not been particularly illustrated in the drawings.

The force feed depositing mechanism includes a plurality of vertically disposed pump cylinders 10 arranged in laterally spaced relation in one transverse row. These cylinders are suitably attached to a pump bar 11, which is secured to the front face of receptacle B near its lower end. Each cylinder 10 is provided with a reciprocating piston 12, which extends out of the cylinder at its upper end through a suitable stuffing box 13, and the upper ends of all the pistons are connected to a common, transversely-disposed bar 14. This bar is mounted for vertical sliding movement in ways formed in members 15 secured to the front face of receptacle B. Trunnions 16, provided on the ends of bar 14, are connected by links 17 to suitable operating mechanism, not shown.

For a more complete disclosure of the general depositor mechanism, including the mold feeding mechanism and the pump operating mechanism, reference may be had to U. S. Letters Patent No. 1,323,949, granted December 2, 1919, on an invention of A. L. Bausman.

Each pump cylinder 10 has an inlet opening 20 adapted to periodically communicate with a corresponding passage 21 leading from receptacle B. A cut off bar 22 controls such communication and is provided with a series of holes 23, one for each cylinder. Bar 22 is slidable transversely of the receptacle, and along a line parallel to the line of the row in which cylinders 10 are arranged, and periodically moves into a position wherein the holes 23 register with their respective passages 20 and 21 and into another position wherein holes 23 are brought completely out of register with such passages. Each cylinder likewise has an outlet passage or nozzle 24 which is adapted to periodically communicate therewith. A cut off bar 25 controls such communication and is provided with a series of holes 26, one for each cylinder. Bar 25 is movable in the same general manner as bar 22 and is adapted to assume a position wherein the holes 26 register with their respective outlets 24 and another position wherein such outlets are closed off from communication with their cylinders 10.

It will be readily apparent from Fig. 4 that, if bars 22 and 25 are connected together to operate in unison, the holes 26 will be brought into communication with nozzles 24 before holes 23 have been moved completely out of communication with passages 21. As soon as these bars have moved any distance greater than the small dimension $x$, the described condition will occur. The arrangement illustrated in Fig. 4 is probably one of the worst commonly encountered and the better serves to illustrate the present problem. It will be seen that at the end of the suction stroke of pistons 12, bar 22 needs to be moved far enough to completely close off passages 21 before bar 25 moves any distance greater than the dimension $x$. However, immediately thereafter bar 25 needs to move into position to open the outlets 24 before the pistons 12 have traveled any substantial distance on their discharge stroke. Consequently, for proper operation, each bar must operate independently and comparatively rapidly. The same necessity for rapid operation of these bars independently of each other, in reverse directions, exists at the end of the discharge stroke and prior to any great degree of travel of pistons 12 on the suction stroke.

In order to operate the bar 25, the following mechanism is provided. A cam 28 is fixed to the main drive shaft S of the depositor and is provided with diametrically opposite sharp rise and drop portions 29 connected by long dwell portions 30, during which the pistons 12 are intended to operate. A cam follower 31, carried by a member 32, guided by shaft S, is provided and member 32 is connected to one end of a lever 33 pivoted at 34 to one side frame A. The other end of lever 33 is connected by a link 35 to one arm of a bell crank 36 pivoted at 37 to a bracket 38 mounted on said side frame A. Preferably the connection between link 35 and bell crank 36 is of an adjustable nature, as indicated at 39, to enable the throw of the bell crank to be varied. A link 40 connects the other arm of bell crank 36 to the cross member of a U-shaped yoke 41, the ends of which are suitably attached to the ends of the cut off bar 25.

For the purpose of operating the cut off bar 22, a similar arrangement is provided which has been illustrated in part only. A cam, similar to cam 28, is fixed to the opposite end of shaft S and operates a lever 42 in a similar manner. Such lever is connected by a link 43 to a bell crank 44, similar to bell crank 36 and similarly mounted, and this bell crank operates by a link 45 a U-shaped yoke 46, the ends of which are attached to the ends of cut off bar 22. It will be apparent that by using two separate cams, they may be so constructed and so located relatively to each other on shaft S, that bar 22 will move prior to bar 25 at the end of the suction stroke and bar 25 will move prior to bar 22 at the end of the discharge stroke.

The invention has been disclosed herein, in an embodiment at present preferred, for illustrative purposes but the scope of the invention is defined by the appended claim rather than by the foregoing description.

I claim:

In a depositor, a supply receptacle, a series of vertically disposed pump cylinders disposed in spaced relation in a transverse row across one upright wall of the receptacle and having inlet ports in their side walls to communicate with openings in said wall of the receptacle and having outlet ports in their bottom walls, a reciprocable cut off bar near the base of said cylinders slidable transversely in a path parallel to the line of said transverse row of cylinders to periodically open and close the outlet ports thereof, a second reciprocable cut off bar disposed at right angles to the first named bar and slidable in a parallel path to periodically open and close the inlet ports, and separate means for reciprocating said cut off bars the one independently of the other so that the outlet ports are entirely closed before the inlet ports are opened and vice versa.

In testimony whereof I have affixed my signature.

GEORGE S. PERKINS.